United States Patent Office 3,379,801
Patented Apr. 23, 1968

3,379,801
INCREASED CRYSTALLIZABILITY OF
POLYCARBONATES
André Jan Conix, Antwerp, and Lambert Gaston Jeurissen, Mortsel-Antwerp, Belgium, assignors to Gevaert Photo-Producten N.V., Mortsel, Belgium, a Belgian company
No Drawing. Filed Dec. 29, 1964, Ser. No. 422,000
Claims priority, application Great Britain, Jan. 2, 1964, 279/64
15 Claims. (Cl. 260—47)

ABSTRACT OF THE DISCLOSURE

Polycarbonates of improved crystallizability consisting essentially of units of the formula:

(A) 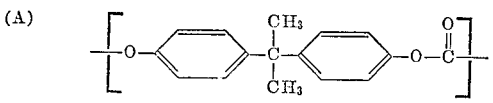

and units of the formula:

(B) 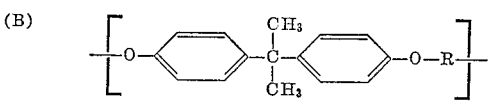

in which R is free of aliphatic unsaturation and is the residue, after removal of the halogeno groups, of a bis(halogenoalkyl)-ester of a dibasic acid or of a halogenoalkylbenzoic acid diester of an aliphatic dihydroxy compound, the halogeno groups being chlorine or bromine, said polycarbonate containing at least about 0.5 but not more than about 20 mole percent units (B) with respect to the total number of the units (A) and (B).

---

Since the article of Schnell in Angw. Chem. 68, 633 (1956) a lot of research has been done on the properties and application of polycarbonates. Practical applications of polycarbonates are based exclusively on their properties in the amorphous state.

The crystallization tendency of polycarbonates is very small. Kämpf stated in Kolloid Zeitschrift, 172, 50 (1960), that the first spherulites only appear after heating at 180° C. for eight days; more pronounced crystallization only occurs after heating at 190° C. for the same period of time. Orientation of films or fibres does not cause any crystallization and after stretching only small improvement of some mechanical properties such as the modulus of elasticity was noted.

High mechanical properties and most of all a high modulus of elasticity of film forming polymers are desired for some applications, such as photographic film base and bases for magnetic recording materials. The so far described polycarbonates possess good film forming properties but lack the desired high modulus of elasticity. In general the modulus of elasticity of films manufactured from a film forming polymer can be increased significantly by orientation but only for those polymers that crystallize on stretching or after heat treatment of the stretched material.

According to the present invention, new polycarbonates are provided which are formed from 2,2-bis(4-hydroxyphenyl)-propane and include in their structure units containing ether linkages, which are obtained by the reaction of a bis(halogenoalkyl)-compound with 2,2-bis(4-hydroxyphenyl)-propane, the halogen substituent being selected from chlorine and bromine.

It has been found that the copolyether carbonates according to the invention posess interesting properties, depending in any given case on the proportion in the molecule of the said units containing ether linkages. In the main we are concerned with copolyether carbonates in which the said units containing ether linkages account for substantially less than 50% of the structural units of the polymer.

An important potential field of application of the invention is the preparation of polycarbonates of improved crystallizability and an important discovery connected with the invention is that copolyether carbonates wherein not more than 20 mole percent of the structural units are units containing ether linkages obtained as above referred to, have good crystallizability and can be used for the manufacture of shaped articles, e.g. films, with a desirably high modulus of elasticity and other properties required for films of various purposes such as bases for photographic film. Copolyether carbonates wherein such limitation on the proportion of the said groups with ether linkages applies, and shaped articles formed from such polycarbonates, constitute preferred embodiments of the invention.

A class of bis(halogenoalkyl)-compounds which may be used in the present invention are the bis(halogenoalkyl)-esters of dibasic acids. These dibasic acids may be selected from the group consisting of aromatic dicarboxylic acids such as terephthalic and isophthalic acid, aliphatic dicarboxylic acids such as adipic acid, cycloaliphatic dicarboxylic acids, heterocyclic dicarboxylic acids such as pyridine dicarboxylic acids, aromatic disulfonic acids such as diphenyl disulfonic acids and benzene disulfonic acids, and aromatic monocarboxysulfonic acids such as sulfobenzoic acids.

Other convenient bis(halogenoalkyl)-compounds are the bis(halogenoalkyl)-phenylenes, also those wherein one or more of the hydrogen atoms of the phenylene ring are substituted by lower alkyls.

Still other bis(halogenoalkyl)-compounds which may be used in the present invention are the halogenoalkylbenzoic acid diesters of aliphatic dihydroxy compounds.

Very convenient bis(halogenoalkyl)-compounds are found between the following products:

bis($\beta$-chloroethyl)-terephthalate
bis($\beta$-chloroethyl)-isophthalate
bis($\delta$-chlorobutyl)-terephthalate
2,5-pyridine-bis($\beta$-chloroethyl)-dicarboxylate
4,4'-diphenyl-bis($\beta$-chloroethyl)-disulfonate
1,3-benzene-bis($\beta$-chloroethyl)-disulfonate
bis($\beta$-chloroethyl)-ester of 4-sulfobenzoic acid
1,4-bis(chloromethyl)-benzene
1,4-bis($\delta$-bromobutyl)-benzene
3,6-bis(chloromethyl)-1,2,4,5-tetramethylbenzene
2,4-bis(chloromethyl)-1,3-dimethylbenzene
hexamethylene-1,6-bis(4-chloromethylbenzoate)

To obtain polycarbonates with increased crystallizability the presence of the two halogenoalkyl groups is of preponderant importance as is provided by our investigations, This can be clearly deduced from the structure of the above enumerated bis(halogenoalkyl)-compounds.

The way in which these halogenoalkyl groups are bound together and the nature of the binding radical or group are of less importance. The sole requirement for this binding group is to be an organic radical inert in the reaction circumstances.

The polycarbonates obtained are true copolyether carbonates which may be prepared according to known methods. Very high molecular weights are obtained using a preferred manufacturing method, wherein an alkali metal salt of 2,2-bis(4-hydroxyphenyl)-propane dissolved in water is reacted at about room temperature with a mixture of (A) the bischloroformate of 2,2-bis(4-hydroxyphenyl)-propane and (B) a bis(halogenoalkyl)-compound, e.g. selected from the compounds and classes of compounds above referred to.

This mixture is dissolved in a water-immiscible organic solvent which is also a solvent for the copolyethercarbonate to be formed. Preferably the above described process is carried out in the presence of minor amounts of onium compounds as catalysts. These are suitably taken from the group consisting of quaternary ammonium compounds, tertiary sulfonium compounds, quaternary phosphonium compounds and quaternary arsonium compounds. The use of these onium compounds as catalysts has been described in pending application Serial No. 95,002 filed March 13, 1961, now U.S. Patent No. 3,227,681.

It is known that the crystallization of highly crystallizable polymers such as polyethylene, poly(ethylene terephthalate) and polyamides is favored by the regularity of their chain structure and that copolycondensation of other groups into the polymer chain will disturb the structural regularity; hence the tendency to crystallize will diminish. In this way it is known that copolycondensates of ethylene glycol with sebacic and terephthalic acids are less crystalline than their homopolymers. (Cf. J. Polymer Science, 8, 503 (1952).) Thus it was very surprising that the polyethercarbonates of the present invention possess such a strongly increased crystallizability.

It is also known that, when the crystallization of polymers can be carried out during or after stretching films or threads prepared from the melt of said polymers, said stretched crystalline films or threads have better mechanical properties than the stretched amorphous films or threads; they have a higher modulus of elasticity and a higher melting point.

There are different methods to crystallize the polyether carbonates of the present invention. One very convenient method consists in heating films, sheets, fibres, threads, and other shaped articles made from the polyethercarbonates for a short time within a temperature range comprised between about ten degrees above the glass transition temperature of the polyethercarbonate considered, and about ten degrees below its crystalline melting point. The heating time and temperature required depend mainly on the specific ether groups introduced in the polycarbonate chain.

While importance is particularly attached to the presence of not more than 20 mole percent of units containing ether linkages in the polyethercarbonate chain to obtain a strong increase of the crystallizability, polycarbonates can be prepared with a higher proportion of such units and which have useful properties for various purposes, and the proportion of such units introduced into the polymer chain will depend on the properties (modulus of elasticity, melting point etc.) which are most important for the particular purpose in view. This clearly appears from the list of properties of the different polyethercarbonates in the examples given below.

The intrinsic viscosities "$[\eta]$" (in dl./g.) mentioned are measured from solutions of the copolyethercarbonate in sym.-tetrachloroethane at 25° C. The crystalline melting point "$T_m$" is determined by heating the sample on the Köfler heating stage of a polarizing microscope. The temperature of the hot stage is raised at a rate of 2° C./min. The temperature is noted at which the last trace of birefringence, observed between crossed nicols, disappears. The glass transition temperature "$T_g$" is determined refractometrically as described in J. Polymer Sci., 2, 10 (1947); 3, 455, 647, 704 (1948); 5, 609 (1950). The Abbe refractometer had to be heated between 50 and 200° C. by means of a thermostat with silicone oil, and between −20 and 50° C. by a circulation pump feeding a thermostatted methanol-water mixture. The softening temperature "S.P." is determined, as described in Plastica, 14, 32, 130 (1961). The mechanical properties, namely the modulus of elasticity "E," the yield strength "Y" and the tensile strength "T" (all in kg./sq. mm.), and the elongation at break "$\epsilon$" (in percent) are determined on an Instron Tensile Tester.

For purposes of comparison only, Example 1 gives the preparation of a polycarbonate prepared by reacting 2,2-bis(4-hydroxyphenyl)-propane and the bischloroformate of 2,2-bis(4-hydroxyphenyl)-propane.

Example 1

4.56 g. of 2,2-bis(4-hydroxyphenyl)-propane (0.02 mole), 0.05 g. of triphenylmethyl arsonium iodide, 0.10 g. of triethylbenzylammonium chloride, 40.8 ml. of 1 N sodium hydroxide and 5 ml. of methylene chloride are successively brought into a three-necked 250 cm.$^3$ flask, provided with a stirrer and a dropping funnel. Whilst stirring at about 20° C., a solution of 7.06 g. of 2,2-bis(4-hydroxyphenyl)-propane-bischloroformate in 15 ml. of methylene chloride is dropwise added within 5 minutes and the funnel is rinsed with 5 ml. of methylene chloride. After the addition of the diacid chloride solution, the reaction mixture is stirred at room temperature for another 20 minutes whereby the polymer separates as a viscous mass. The supernatant aqueous layer is decanted and the residue washed with 50 ml. of water, whilst strongly stirring. The wash water is decanted and the polymer solution poured into boiling water. The polymer is separated and dried. The intrinsic viscosity, measured in sym.-tetrachloroethane, amounts to 1.0 dl./g. The properties of the polycarbonate are given in Table 1 following hereinafter under Polymer No. 1. The crystallizability of the polycarbonate is found to be very small. Just as did Kämpf in Kolloid Zeitschrift, 172, 50 (1960), it was found that the first spherulites only appear after heating at 180° C. for eight days.

Example 2

4.56 g. of bis(4-hydroxyphenyl)-propane (0.02 mole), 0.05 g. of triphenylmethylarsonium iodide, 0.10 g. of triethylbenzylammonium chloride, 40.8 ml. of 1 N sodium hydroxide and 5 ml. of methylene chloride are successively brought into a three-necked 250 cm.$^3$ flask, provided with a stirrer and a dropping funnel. Whilst vigorously stirring at 20° C., a solution of 7.0247 g. of 2,2-bis(4-hydroxyphenyl)-propane-bischloroformate (0.0199 mole) and 0.0291 g. of bis($\beta$-chloroethyl)-terephthalate (0.0001 mole) in 15 ml. of methylene chloride is added dropwise within 5 minutes. After the addition of the diacid chloride solution, the reaction mixture is stirred at room temperature for another 20 min. The supernatant aqueous layer is decanted from the viscous polymer solution. The polymer solution is stirred 5 min. with 50 ml. of water and thereafter the wash water is decanted and the polymer solution is poured into boiling water. The polymer is collected and dried. The intrinsic viscosity is measured in sym.-tetrachloroethane at 25° C. and found to be 1.06 dl./g.

The properties of the copolyether carbonate obtained are given in Table No. 1 under Polymer No. 2 and in the discussion thereafter.

Examples 3–19

The procedure of Example 2 is followed but using the appropriate amounts of reagents in order to obtain the molar proportions indicated in the following Table 1, wherein also the properties of the polyether carbonates obtained are given (Polymers Nos. 3–19).

ticity between 284 and 299 kg./sq. mm.; the polymers Nos. 2, 3 and 6, containing respectively 0.5, 1 and 3 mole percent of ether units, have a modulus of 302–309 kg./sq. mm., and the polymer No. 10 containing 9.5 mole percent of ether units even has a modulus of 318 kg./sq. mm., which corresponds to an increase of about 35%.

TABLE 1

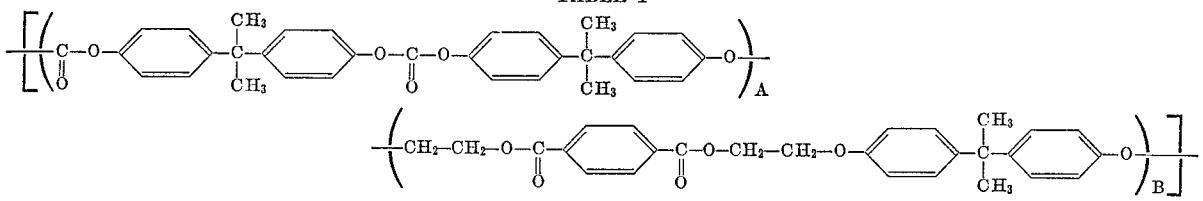

| Polymer No. | Ratio A | Ratio B | $T_m$, °C. | $T_g$, °C. | S.P. °C. | E, kg./sq. mm. | Y, kg./sq. mm. | T, kg./sq. mm. | $\epsilon$ percent | $[\eta]$ dl./g. |
|---|---|---|---|---|---|---|---|---|---|---|
| 1 | 100 | | 268 | 148 | 145 | 233 | 6.6 | 6.6 | 12 | 1.0 |
| 2 | 99.5 | 0.5 | 232 | | 170–205 | 304 | 7.4 | 7.2 | 5.6 | 1.06 |
| 3 | 99 | 1 | 232 | | 160–195 | 309 | 7.3 | 6.6 | 30 | 1.11 |
| 4 | 98.5 | 1.5 | 228 | | 165–205 | 299 | 7.0 | 6.3 | 75 | 1.32 |
| 5 | 98 | 2 | 230 | 140 | 175–205 | 284 | 7.7 | 7.3 | 10 | 1.06 |
| 6 | 97 | 3 | 228 | | 155–190 | 302 | 7.5 | 7.2 | 5.3 | 1.20 |
| 7 | 96 | 4 | 231 | 127 | 145–180 | 291 | 7.4 | 7.0 | 5.5 | 1.44 |
| 8 | 94 | 6 | 227 | 112 | 175–195 | 292 | 7.5 | 7.3 | 6.0 | 1.21 |
| 9 | 92 | 8 | 228 | 75 | 65–85 | 270 | 6.5 | 5.9 | 19 | 1.49 |
| 10 | 90.5 | 9.5 | 230 | | 170–210 | 318 | 6.4 | 6.1 | 4.9 | 0.92 |
| 11 | 90 | 10 | 232 | | 160–180 | 269 | 7.0 | 6.1 | 16 | 1.40 |
| 12 | 88 | 12 | 228 | 71 | 65–75 | 277 | 6.5 | 5.9 | 13 | 1.48 |
| 13 | 86 | 14 | 231 | 66 | 70–80 | 259 | 6.6 | 6.0 | 8.0 | 1.36 |
| 14 | 81.8 | 18.2 | 236 | | 170–190 | 289 | | 4.4 | 2.0 | 0.86 |
| 15 | 80 | 20 | 222 | 65 | 60–70 | 260 | 6.2 | 5.3 | 48 | 1.34 |
| 16 | 74.3 | 25.7 | 238 | | 175 | 220 | 4.0 | 3.8 | 7.4 | 0.90 |
| 17 | 70 | 30 | 231 | | 90 | 235 | 4.2 | 3.6 | 4 | 0.62 |
| 18 | 70 | 30 | 235 | 38 | 50–60 | 252 | 5.9 | 5.2 | 8 | 1.39 |
| 19 | 60 | 40 | 225 | 34 | 34–45 | 272 | 5.0 | 3.7 | 30 | 1.26 |

$T_m$ = crystalline melting point.
$T_g$ = glass transition temperature.
S.P. = softening temperature.
E = modulus of elasticity.
Y = yield strength.
T = tensile strength.
$\epsilon$ = elongation at break.
$[\eta]$ = intrinsic viscosity.

The crystallizability of polymers Nos. 2 to 19 is considerably increased in comparison with the crystallizability of pure polycarbonate. The incorporation of very few ethoxyterephthalate units strongly increases the crystallizability. The copolymer crystallizes after being heated for 3 hours at 180° C. when as little as 0.5 mole percent of ethoxyterephthalate units (Polymer No. 2) are present. Higher percentages still increase this crystallizability, as e.g. Polymer No. 3 (containing 1 mole percent ethoxy terephthalate units) crystallizes after being heated for 2 hours at 180° C.

The influence of molecular weight on the crystallizability was also determined. A series of polycondensates with the same composition (2% of ethoxyterephthalate units), but with varying degrees of polymerization was prepared ($[\eta]$ from 0.7 to 1.4 dl./g.). In this range of viscosities the molecular weight was shown to have no marked influence either on the crystallizability or on the crystalline melting point.

The glass transition temperatures decrease with increasing amount of ether groups, as expected from theory.

The softening temperatures of polymers Nos. 2, 3, 4 and 5, containing from 0.5 to 2 mole percent of ethoxyterephthalate units, the softening temperature of polymer No. 8, containing 6 mole percent of said ether units, and even this of polymer No. 10 or 14, containing 10–20 mole percent of the ether units, are about 40–60° C. higher than that of the pure polycarbonate. A film manufactured therefrom is microcrystalline as is shown from its X-ray diffraction photographs. Consequently the incorporation of very few ether units increases the softening point to a very high degree.

These copolymers, having an elevated softening temperature as compared to pure polycarbonate, also have a much higher modulus of elasticity. The polymers Nos. 4, 5, 7, 8 and 14, containing from 1.5 to 20 moles percent of ethoxyterephthalate units, have moduli of elas- The yield and the tensile strengths also increase, giving for Polymer No. 5 (2 mole percent of ether units) respectively 7.7 and 7.3 kg./sq. mm.

Example 20

4.56 g. of 2,2-bis(4-hydroxyphenyl)-propane (0.02 mole), 40.8 ml. of 1 N sodium hydroxide, 0.05 g. of triphenylmethylarsonium iodide and 5 ml. of methylene chloride are successively brought into a three-necked 250 cm.³ flask, provided with a stirrer and a dropping funnel. Whilst stirring at 20° C., a solution of 6.9394 g. of 2,2-bis(4-hydroxyphenyl)-propane-bischloroformate (0.0198 mole) and 0.0696 g. of 1,4-bis(δ-bromobutyl)-benzene (0.0002 mole) into 15 ml. of methylene chloride is added dropwise within 5 minutes. After the addition of the diacid chloride solution, the reaction mixture is stirred at room temperature for another 10 minutes whereby the polymer separates as a viscous mass. The supernatant aqueous layer is decanted and the residue washed two times with 50 cm.³ of water, whilst strongly stirring, whereafter the polymer solution is poured into boiling water. The polymer is separated and dried. The intrinsic viscosity is measured in sym.-tetrachloroethane at 25° C. and found to be 1.46 dl./g. The copolyether carbonate obtained contains 1 mole percent of ether linkages containing units.

Examples 21 and 22

The procedure of Example 20 is repeated but using respectively 0.019 and 0.016 mole of 2,2-bis(4-hydroxyphenyl)-propane-bischloroformate and respectively 0.001 and 0.004 mole of 1,4-bis(δ-bromobutyl)-benzene. The obtained copolyether carbonates contain consequently respectively 5 and 20 mole percent of ether linkages containing units.

The influence of these incorporations upon the crystallizability of the obtained copolyether carbonates is profound (polymers Nos. 20, 21 and 22). All these copolymers crystallize faster as pure polycarbonate does, as e.g. polymer No. 22 crystallizes after heating at 180° C. for only 3 hours.

The mechanical properties and thermal transition points of these copolyether carbonates are given in Table 2.

The softening temperatures of films cast from the copolyether carbonates Nos. 20 and 21 are about 40–50° C. higher than that of pure polycarbonate.

These copolymers, having an elevated softening temperature as compared to pure polycarbonate, also have a higher modulus of elasticity. The polymer No. 21, containing 5 mole percent of ether units, has a modulus of 300 kg./sq. mm., which corresponds to an increase of about 30% compared to pure polycarbonate.

The yield and tensile strengths also increase considerably, giving for the copolyether carbonate No. 21 8.2 kg./sq. mm., which corresponds to an increase of about 25%.

In Table 2 and also in the following Tables 3 and 4, the symbols $T_m$, S.P., E, Y, T, $\epsilon$ and $[\eta]$ have the same significance as in Table 1. For purposes of comparison the corresponding values of the pure polycarbonate of Example 1 are added in each table under Polymer No. 1.

mer is separated and dried. The intrinsic viscosity, measured in sym.-tetrachloroethane at 25° C. amounts to 1.10 dl./g. The copolymer obtained contains 1 mole percent of ether linkages containing units.

Examples 24 and 25

The procedure of Example 23 is repeated but using respectively 0.019 and 0.018 mole of 2,2-bis(4-hydroxyphenyl)-propane bischloroformate and respectively 0.001 and 0.002 mole of 3,6-bis(chloromethyl)-1,2,4,5-tetramethylbenzene. The obtained copolyether carbonates contain consequently 5 and 10 mole percent of ether linkages containing units respectively.

The influence of these incorporations upon the crystallizability is very profound (polymers Nos. 23–25). The copolymers 24 and 25 crystallize after heating for 4 hours at 180° C., and the copolymer 23, containing only 1 mole percent of ether linkages containing units, crystallizes even after heating for only 3 hours at 180° C.

The mechanical properties and thermal transition points of these copolyether carbonates are given in Table 3.

The softening temperatures of films cast from the copolyether carbonates, are about 60° C. higher than that of the pure polycarbonate.

TABLE 2

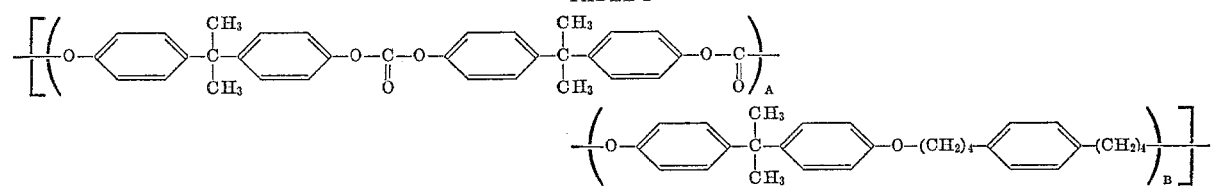

| Polymer No. | Ratio A | Ratio B | $T_m$, °C. | S.P., °C. | E, kg./sq. mm. | Y, kg./sq. mm. | T, kg./sq. mm. | $\epsilon$, percent | $[\eta]$, dl./g. |
|---|---|---|---|---|---|---|---|---|---|
| 1 | 100 | | 268 | 145 | 233 | 6.6 | 6.6 | 12 | 1.0 |
| 20 | 99 | 1 | 237 | 150-185 | 261 | 8.0 | 7.0 | 57 | 1.46 |
| 21 | 95 | 5 | 231 | 160-200 | 300 | 8.2 | 8.2 | 5 | 1.06 |
| 22 | 80 | 20 | 225 | 70-95 | 277 | 6.3 | 5.6 | 60 | 1.22 |

Example 23

4.56 g. of 2,2-bis(4-hydroxyphenyl)-propane (0.02 mole), 40.8 ml. of 1 N sodium hydroxide, 0.05 g. of triphenylmethylarsonium iodide and 5 ml. of methylene chloride are successively brought into a three-necked 250 cm.³ flask, provided with a stirrer and a dropping funnel. Whilst stirring at 20° C., a solution of 6.9394 g. of 2,2-bis(4-hydroxyphenyl)-propane-bischloroformate (0.0198 mole) and 0.0462 g. of 3,6-bis(chloromethyl)-1,2,4,5-tetramethylbenzene (0.0002 mole) into 15 ml. of methylene chloride is added dropwise within 5 minutes. After this addition the reaction mixture is stirred at room temperature for another 20 minutes, whereby the polymer separates as a viscous mass. The supernatant aqueous layer is decanted and the residue washed twice with 50 cm.³ of water whilst strongly stirring, whereafter the polymer solution is poured into boiling water. The poly- The modulus of elasticity amounts to about 300 kg./sq./mm., corresponding to an increase of about 30%.

TABLE 3

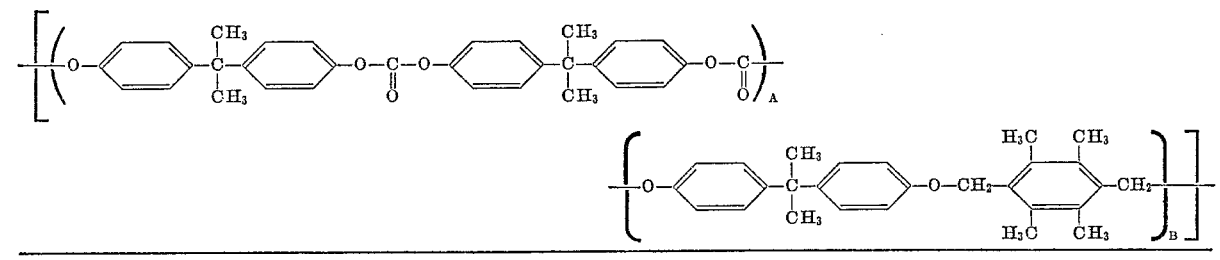

| Polymer No. | Ratio A | Ratio B | $T_m$, °C. | S.P., °C. | E, kg./sq. mm. | Y, kg./sq. mm. | T, kg./sq. mm. | $\epsilon$, percent | $[\eta]$, dl./g. |
|---|---|---|---|---|---|---|---|---|---|
| 1 | 100 | | 268 | 145 | 233 | 6.6 | 6.6 | 12 | 1.0 |
| 23 | 99 | 1 | 236 | 155-210 | 300 | 7.7 | 7.0 | 7 | 1.10 |
| 24 | 95 | 5 | 234 | 145-210 | 298 | 7.5 | 6.4 | 25 | 1.42 |
| 25 | 90 | 10 | 231 | 140-205 | 294 | 7.0 | 6.4 | 18 | 1.24 |

Example 26

4.56 g. of 2,2-bis(4-hydroxyphenyl)-propane (0.02 mole), 40.8 ml. of 1 N sodium hydroxide, 0.05 g. of triphenylmethylarsonium iodide and 5 ml. of methylene chloride are successively brought into a three-necked 250 cm.³ flask, provided with a stirrer and a dropping funnel. Whilst stirring at 20° C., a solution of 6.9394 g. of 2,2-bis(4-hydroxyphenyl)-propane-bischloroformate (0.0198 mole) and 0.0406 g. of 2,4-bis(chloromethyl)-1,3-dimethylbenzene (0.0002 mole) into 15 ml. of methylene chloride is added dropwise within 5 minutes. After this addition the reaction mixture is stirred at room temperature for another 10 minutes whereby the polymer separates as a viscous mass. The supernatant aqueous layer is decanted and the residue washed twice with 50 ml. of water whilst strongly stirring, whereafter the polymer solution is poured into boiling water. The polymer is separated and dried. The intrinsic viscosity, measured in sym.-tetrachloroethane at 25° C. amounts to 1.40 dl./g. The copolymer obtained contains consequently 1 mole percent of ether linkages containing units.

Examples 27–29

The procedure of Example 26 is repeated but using respectively 0.019, 0.018 and 0.016 mole of 2,2-bis(4-hydroxyphenyl) - propane-bischloroformate and 0.001, 0.002 and 0.004 mole of 2,4-bis(chloromethyl)-1,3-dimethylbenzene. The obtained copolymers contain consequently 5, 10 and 20 mole percent of ether linkages containing units.

The influence of these incorporations upon the crystallizability is very profound (polymers Nos. 26–29). The copolymer No. 27, containing 5 mole percent of ether linkages containing units, crystallizes after heating for 4 hours at 180° C., and the copolymer No. 26 containing only 1 mole of ether linkages containing units, crystallizes after being heated for only 3 hours at the same temperature.

The mechanical properties and thermal transition points of these copolyether carbonates are given in Table 4.

The softening temperatures of films cast from the copolymers Nos. 26, 27 or 28 are about 60° C. higher than that of pure polycarbonate.

The modulus of elasticity amounts to about 300 kg./sq. mm. and the yield and tensile strengths to about 7.5 kg./sq. mm.

mate (0.0199 mole) and 0.0291 g. of bis($\beta$-chloroethyl)-isophthalate (0.0001 mole) into 15 ml. of methylene chloride is added dropwise within 5 minutes. After this addition the reaction mixture is stirred at room temperature for another 10 minutes whereby the polymer separates as a viscous mass. The supernatant aqueous layer is decanted and the residue washed with 50 ml. of water, whilst strongly stirring whereafter the polymer solution is poured into boiling water. The polymer is separated and dried. The intrinsic viscosity, meausured in sym.-tetrachloroethane at 25° C. amounts to 0.94 dl./g. The copolyether carbonate obtained contains 0.5 mole percent of ethoxy isophthalate units.

Example 31

The procedure of Example 30 is repeated but using 0.0198 mole of 2,2-bis(4-hydroxyphenyl)-propane-bischloroformate and 0.0002 mole of bis($\beta$-chloroethyl)-isophthalate. The obtained copolyether carbonate contains consequently 1 mole perecent of ethoxyisophthalate units.

Examples 32–34

The procedure of Example 30 is repeated but using respectively 0.0196, 0.019 and 0.018 mole of 2,2-bis(4-hydroxyphenyl) - propane-bischloroformate and 0.0004, 0.001 and 0.002 mole of bis($\beta$-chloroethyl)-isophthalate. The obtained copolyether carbonates contain consequently 2, 5 and 10 mole percent of ethoxyisophthalate units.

The incorporation of ethoxyisophthalate units (polymers Nos. 30–34) has a pronounced influence upon the crystallizability of the copolycondensates.

All these copolymers crystallize much faster than pure polycarbonate does. Spherulites appear after heating at 180° C. for only 3 hours.

The properties of the copolyether carbonates prepared according to the procedures of Examples 30 to 34 are given in Table 5 (polymers Nos. 30 to 34).

The softening temperatures of films cast from the copolymers Nos. 30, 31, 32 and 33 are about 40–50° C. higher than that of pure polycarbonate.

TABLE 4

$$\left[ \left( O - \bigcirc - \underset{\underset{CH_3}{|}}{\overset{\overset{CH_3}{|}}{C}} - \bigcirc - O - \underset{O}{\overset{\|}{C}} - O - \bigcirc - \underset{\underset{CH_3}{|}}{\overset{\overset{CH_3}{|}}{C}} - \bigcirc - O - \underset{O}{\overset{\|}{C}} \right)_A \right.$$

$$\left. \left[ O - \bigcirc - \underset{\underset{CH_3}{|}}{\overset{\overset{CH_3}{|}}{C}} - \bigcirc - O - CH_2 - \bigcirc\!\!\!\!\!\begin{smallmatrix}CH_3\\CH_2-\\CH_3\end{smallmatrix} \right]\right]$$

| Polymer No. | Ratio A | Ratio B | Tm, °C. | S.P., °C. | E, kg./sq. mm. | Y, kg./sq. mm. | T, kg./sq. mm. | $\epsilon$, Percent | [$\eta$], dl./g. |
|---|---|---|---|---|---|---|---|---|---|
| 1 | 100 | | 268 | 145 | 233 | 6.6 | 6.6 | 12 | 1.0 |
| 26 | 99 | 1 | 233 | 120–205 | 284 | 7.4 | 7.5 | 14 | 1.40 |
| 27 | 95 | 5 | 234 | 170–210 | 296 | 7.6 | 7.0 | 21 | 1.22 |
| 28 | 90 | 10 | 229 | 155–205 | 285 | 7.4 | 6.3 | 40 | 1.55 |
| 29 | 80 | 20 | 230 | 90 | 249 | 6.6 | 6.2 | 51 | 1.50 |

Example 30

4.56 g. of 2,2-bis(4-hydroxyphenol)-propane (0.02 mole), 40.8 ml. of 1 N sodium hydroxide, 0.05 g. of triphenylmethylarsonium iodide and 5 ml. of methylene chloride are successively brought into a three-necked 250 cm.³ flask, provided with a stirrer and a dropping funnel. Whilst stirring at about 20° C., a solution of 7.0247 g. of 2,2 - bis(4 - hydroxyphenyl)-propane-bischlorofor-

TABLE 5

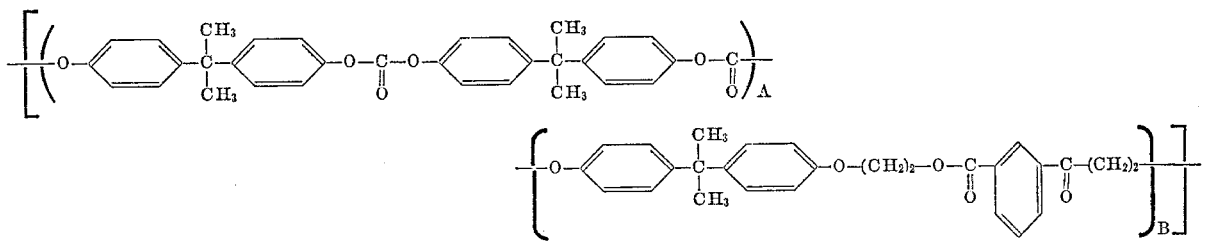

| Polymer No. | Ratio A | Ratio B | Tm, °C | S.P., °C | E, kg./sq. mm. | Y, kg./sq. mm. | T, kg./sq. mm. | ε, Percent | [η], dl./g. |
|---|---|---|---|---|---|---|---|---|---|
| 1  | 100 | ---- | 268 | 145 | 233 | 6.6 | 6.6 | 12 | 1.0 |
| 30 | 99.5 | 0.5 | 234 | 160-190 | 255 | 5.8 | 4.9 | 58 | 0.94 |
| 31 | 99 | 1 | 229 | 160-185 | 248 | 5.6 | 4.5 | 69 | 1.04 |
| 32 | 98 | 2 | 225 | 160-190 | 261 | 5.7 | 4.7 | 63 | 1.04 |
| 33 | 95 | 5 | 227 | 160-195 | 254 | 5.6 | 5.0 | 9 | 0.70 |
| 34 | 90 | 10 | 228 | 135-175 | 221 | 5.0 | 4.0 | 60 | 0.82 |

Example 35

4.56 g. of 2,2 - bis(4-hydroxyphenyl)-propane (0.02 mole), 40.8 ml. of 1 N sodium hydroxide, 0.05 g. of triphenylmethylarsonium iodide and 5 ml. of methylene chloride are successively brought into a three-necked 250 cm.³ flask, provided with a stirrer and a dropping funnel. Whilst stirring and at 20° C., a solution of 6.9188 g. of 2,2 - bis(4 - hydroxyphenyl) - propane-bischloroformate (0.0196 mole) and 0.1692 g. of hexamethylene-1,6-bis(4-chloromethylbenzoate) (0.0004 mole) into 15 ml. of methylene chloride is added dropwise within 5 minutes. After this addition the reaction mixture is stirred at room temperature for another 10 minutes, whereby the polymer separates as a viscous mass. The supernatant aqueous layer is decanted and the residue washed three times with 50 ml. of water, whilst strongly stirring, whereafter the polymer solution is poured into boiling water. The polymer is separated and dried. The intrinsic viscosity is measured in sym.-tetrachloroethane at 25° C. and found to be 1.06 dl./g. The copolyether carbonate obtained contains 2 mole percent of ether linkages containing units.

Examples 36–37

The procedure of Example 35 is repeated but using respectively 0.019 and 0.018 mole of 2,2-bis(4-hydroxyphenyl)-propane-bischloroformate and 0.001 and 0.002 mole of hexamethylene-1,6-bis(4-chloromethylbenzoate). The obtained copolymers contain respectively 5 and 10 mole percent of ether linkages containing units.

This incorporation has a pronounced influence upon the crystallizability of the copolymers. The polymers Nos. 35 and 36 crystallize after heating for 8 hours at 180° C.

The properties of the copolyether carbonates prepared according to the procedures of Examples 35 to 37 are given in Table 6 (polymers Nos. 35, 36 and 37).

The softening temperatures of films cast from these copolyethercarbonates are about 50° C. higher than that of pure polycarbonate.

The modulus of elasticity amounts to about 290 kg./sq. mm., corresponding to an increase of about 25%. The yield and tensile strengths amount to about 8 kg./sq. mm.

TABLE 6

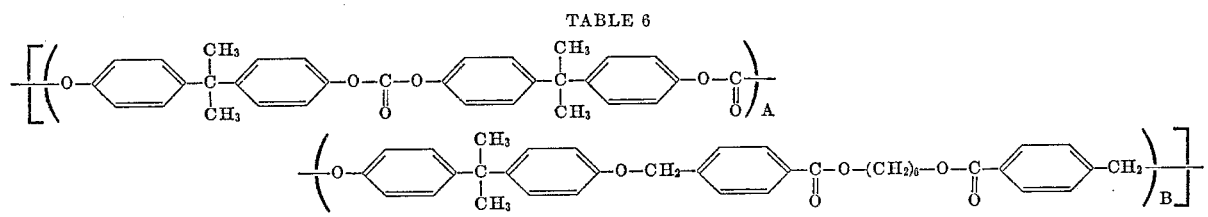

| Polymer No. | Ratio A | Ratio B | Tm, °C | S.P. °C | E, kg./sq. mm. | Y, kg./sq. mm. | T, kg./sq. mm. | ε, Percent | [η], dl./g. |
|---|---|---|---|---|---|---|---|---|---|
| 1  | 100 | ---- | 268 | 145 | 233 | 6.6 | 6.6 | 12 | 1.0 |
| 35 | 98 | 2 | 228 | 165-190 | 289 | 8.2 | 7.6 | 9.4 | 1.06 |
| 36 | 95 | 5 | 225 | 170-195 | 203 | 8.3 | 7.3 | 39 | 1.18 |
| 37 | 90 | 10 | 225 | 190-200 | 286 | 7.0 | 6.7 | 112 | 1.21 |

Example 38

4.56 g. of 2,2-bis(4-hydroxyphenyl)-propane (0.02 mole), 40.8 ml. of 1 N sodium hydroxide, 0.05 g. of triphenylmethyl-arsonium iodide and 5 ml. of methylene chloride are successively brought into a three-necked 250 cm.³ flask, provided with a stirrer and a dropping funnel. Whilst stirring at 20° C., a solution of 6.9394 g. of 2,2-bis(4-hydroxyphenyl-propane - bischloroformate (0.0198 mole) and 0.0584 g. of the bis(β-chloroethyl)-ester of 2,5-pyridine-dicarboxylic acid (0.0002 mole) into 15 ml. of methylene chloride is added dropwise within 5 minutes. After this addition the reaction mixture is stirred at room temperature for another 10 minutes, whereby the polymer separates as a viscous mass. The supernatant aqueous layer is decanted and the residue washed twice with 50 cm.³ of water whilst strongly stirring, whereafter the polymer solution is poured into boiling water. The polymer is separated and dried. The intrinsic viscosity, measured in sym.-tetrachloroethane at 25° C. amounts to 0.85 dl./g. The obtained copolymer contains 1 mole percent of ether linkages containing units.

Examples 39–42

The procedure of Example 38 is repeated but using respectively 0.0199, 0.196, 0.019 and 0.018 mole of 2,2-bis(4 - hydroxyphenyl) - propane - bischloroformate and 0.0001, 0.0004, 0.001 and 0.002 mole of bis(β-chloroethyl)-ester of 2,5-pyridine-dicarboxylic acid. The obtained copolymers contain respectively 0.5, 2, 5 and 10% of units containing ether linkages.

This incorporation has a pronounced influence upon the crystallizability of the copolymers. The polymers Nos. 38-42 crystallize after being heated for 4 hours at 180° C.

The properties of these polyethercarbonates are given in Table 7.

Examples 44-47

The procedure of Example 43 is repeated but using respectively 0.0199, 0.0196, 0.019 and 0.018 mole of 2,2-bis(4-hydroxyphenyl) - propane - bischloroformate and 0.0001, 0.0004, 0.001 and 0.002 mole of bis($\beta$-chloroethyl)-ester of 4,4'-diphenyldisulfonic acid. The obtained

TABLE 7

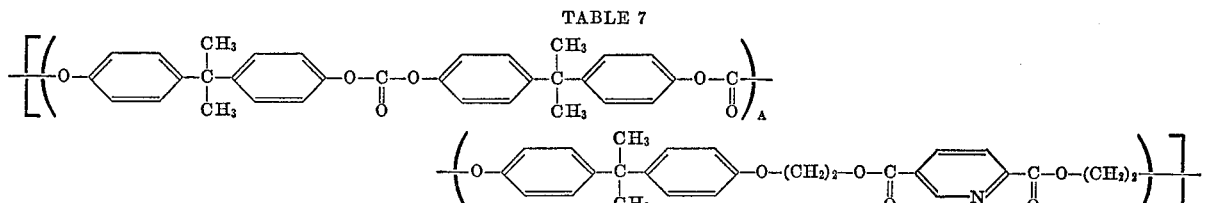

| Polymer No. | Ratio A | Ratio B | Tm, °C. | S.P. °C. | E, kg./sq. mm. | Y, kg./sq. mm. | T, kg./sq. mm. | $\epsilon$, Percent | $[\eta]$, dl./g. |
|---|---|---|---|---|---|---|---|---|---|
| 1 | 100 | | 268 | 148 | 145 | 233 | 6.6 | 6.6 | 12 | 1.0 |
| 39 | 99.5 | 0.5 | 232 | 115 | 110-125 | 230 | 7.1 | 7.3 | 135 | 1.53 |
| 38 | 99 | 1 | 237 | | 75-100 | 213 | 6.2 | 5.7 | 5.3 | 1.25 |
| 40 | 98 | 2 | 239 | 112.5 | 80-100 | 231 | 6.3 | 6.0 | 97 | 1.29 |
| 41 | 95 | 5 | 237 | 100 | 100-110 | 230 | 6.7 | 6.7 | 4.5 | 1.65 |
| 42 | 90 | 10 | 235 | 90.5 | 80-100 | 253 | 6.9 | 6.3 | 52 | 1.64 |

In the above Examples 38-42 the bis($\beta$-chloroethyl)-ester of 2,5-pyridine dicarboxylic acid may be replaced by the bis(chloroalkyl)-esters of other pyridine dicarboxylic acids such as 2,6-pyridine-, 2,4-pyridine- and 3,5-pyridine-dicarboxylic acids. By the addition to the polycondensation mixture of these bis(chloroalkyl) compounds, an increase of crystallizability is noted too.

Example 43

4.56 g. of 2,2-bis(4-hydroxyphenyl)-propane (0.02 mole), 40.8 ml. of 1 N sodium hydroxide, 0.05 g. of triphenylmethyl-arsonium iodide and 5 ml. of methylene chloride are successively brought into a three-necked 250 cm.³ flask, provided with a stirrer and a dropping funnel. Whilst stirring at 20° C., a solution of 6.9394 g. of 2,2-bis(4-hydroxyphenyl)-propane-bis-chloroformate (0.0198 mole) and 0.0878 g. of bis($\beta$-chloroethyl)-ester of 4,4'-diphenyldisulfonic acid (0.0002 mole) into 15 ml. of methylene chloride is added dropwise within 5 minutes. After this addition the reaction mixture is stirred at room temperature for another 10 minutes, whereby the polymer separates as a viscous mass. The supernatant aqueous layer is decanted and the residue washed twice with 50 cm.³ of water whilst strongly stirring, whereafter the polymer solution is poured into boiling water. The polymer is separated and dried. The intrinsic viscosity, measured in sym.-tetrachloroethane at 25° C. amounts to 0.97 dl./g. The obtained copolyethercarbonate contains 1 mole percent of ether linkage containing unit.

copolymers contain respectively 0.5, 2, 5 and 10% of units containing ether linkages.

This incorporation has a pronounced influence upon the crystallizability of the copolymers. The polymers Nos. 44-47 crystallize after being heated for only 3 hours at 180° C.

The softening temperatures of polymers Nos. 43, 44 and 45 are about 50-65° C. higher than that of the pure polycarbonate.

These polymers have also a much higher modulus of elasticity, increasing up to 290 kg./sq. mm.

The yield and tensile strengths also increase considerably, e.g. 8.2 and 7.5 kg./sq. mm. respectively for Polymer No. 44 (2 mole percent of ether units).

The properties of the polyether carbonates obtained according to the procedures of Examples 43-47 are given in Table 8.

TABLE 8

| Polymer No. | Ratio A | Ratio B | Tm, °C. | S.P., °C. | E, kg./sq. mm. | Y, kg./sq. mm. | T, kg./sq. mm. | $\epsilon$, percent | $[\eta]$, dl./g. |
|---|---|---|---|---|---|---|---|---|---|
| 1 | 100 | | 268 | 145 | 233 | 6.6 | 6.6 | 12 | 1.0 |
| 44 | 99.5 | 0.5 | 236 | 175-200 | 270 | 8.2 | 7.5 | 15 | 1.14 |
| 43 | 99 | 1 | 237 | 175-210 | 288 | 7.7 | 6.8 | 65 | 1.20 |
| 45 | 98 | 2 | 231 | 170-195 | 251 | 8.0 | 7.2 | 103 | 1.28 |
| 46 | 95 | 5 | 236 | 90-105 | 233 | 6.6 | 6.9 | 121 | 1.40 |
| 47 | 90 | 10 | 235 | 85-100 | 243 | 7.1 | 7.5 | 124 | 1.43 |

Example 48

4.56 g. of 2,2-bis(4-hydroxyphenyl)-propane (0.02 mole), 40.8 ml. of 1 N sodium hydroxide, 0.05 g. of triphenylmethylarsonium iodide and 5 ml. of methylene chloride are successively brought into a three-necked 250 cm.³ flask, provided with a stirrer and a dropping funnel. Whilst stirring at 20° C., a solution of 6.9394 g. of 2,2-bis(4-hydroxyphenyl)-propane-bis-chloroformate (0.0198 mole) and 0.0654 g. of bis($\beta$-chloroethyl)-ester of benzoyl-4-sulfonic acid (0.0002 mole) into 15 ml. of methylene chloride is added dropwise within 5 minutes. After this addition the reaction mixture is stirred at room temperature for another 10 minutes, whereby the polymer separates as a viscous mass. The supernatant aqueous layer is decanted and the residue washed twice with 50 cm.³ of water whilst strongly stirring, whereafter the polymer solution is poured into boiling water. The polymer is separated and dried. The intrinsic viscosity, measured in sym.-tetrachloroethane at 25° C. amounts to 1.12 dl./g. The obtained copolyether carbonate, containing 1 mole percent of ether linkages containing units, crystallizes after heating for 4 hours at 180° C.

Example 49

4.56 g. of 2,2-bis(4-hydroxyphenyl)-propane (0.02 mole), 40.8 ml. of 1 N sodium hydroxide, 0.05 g. of triphenylmethylarsonium iodide and 5 ml. of methylene chloride are successively brought into a three-necked 250 cm.³ flask, provided with a stirrer and a dropping funnel. Whilst stirring at 20° C., a solution of 6.707 g. of 2,2-bis(4-hydroxyphenyl) - propane-bis-chloroformate (0.019 mole) and 0.264 g. of p-xylylene dibromide (0.001 mole) in 15 ml. of methylene chloride is added dropwise within 5 minutes. After this addition the reaction mixture is stirred at room temperature for another 10 minutes, whereby the polymer separates as a viscous mass. The supernatant aqueous layer is decanted and the residue washed twice with 50 cm.³ of water whilst strongly stirring, whereafter the polymer solution is poured into boiling water. The polymer is separated and dried. The intrinsic viscosity, measured in sym.-tetrachloroethane at 25° C. amounts to 1.12 dl./g. The obtained copolyether carbonate contains 5 mole percent of units containing ether linkages.

Example 50

The procedure of Example 49 is repeated but using 0.016 mole of 2,2-bis(4-hydroxyphenyl)-propane-bischloroformate and 0.004 mole of p-xylylene dichloride. The obtained copolymer contains 20% of units containing ether linkages.

This incorporation has a pronounced influence upon the crystallizability of the copolymers, which crystallize after heating for 5 hours at 180° C.

The properties of the polyethercarbonates obtained according to the procedures of Examples 49 and 50 are given in Table 9.

and units of the formula:

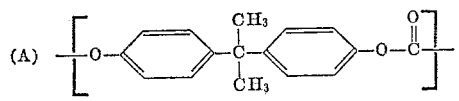

in which R is free of aliphatic unsaturation and is the residue, after removal of the halogeno groups, of a bis(halogenoalkyl)-ester of a dibasic acid or of a halogenoalkylbenzoic acid diester of an aliphatic dihydroxy compound, the halogeno groups being chlorine or bromine, said polycarbonate containing at least about 0.5 but not more than about 20 mole percent units (B) with respect to the total number of the units (A) and (B).

2. The polycarbonate of claim 1 wherein said dibasic acid is a member of the group consisting of aromatic, aliphatic, cycloaliphatic and heterocyclic dicarboxylic acids, and aromatic disulfonic and aromatic monocarboxysulfonic acids.

3. A polycarbonate according to claim 1, wherein the bis(halogenoalkyl)-ester of a dibasic acid is a bis(halogenoalkyl)-ester of an aromatic dicarboxylic acid.

4. A polycarbonate according to claim 3, wherein the bis(halogenoalkyl)-ester of a dicarboxylic acid is a bis(halogenoalkyl)-ester of a terephthalic acid.

5. A polycarbonate according to claim 4, wherein the bis(halogenoalkyl)-ester of terephthalic acid is bis(β-chloroethyl)-terephthalate.

6. A polycarbonate according to claim 3, wherein the bis(halogenoalkyl)-ester of a dicarboxylic acid is a bis(halogenoalkyl)-ester of isophthalic acid.

7. A polycarbonate according to claim 6, wherein the bis(halogenoalkyl)-ester of isophthalic acid is bis(β-chloroethyl)-isophthalate.

8. A polycarbonate according to claim 1, wherein the bis(halogenoalkyl)-ester of a dibasic acid is a bis(halogenoalkyl)-ester of an aliphatic dicarboxylic acid.

9. A polycarbonate according to claim 1, wherein the bis(halogenoalkyl)-ester of a dibasic acid is a bis(halogenoalkyl)-ester of a cycloaliphatic dicarboxylic acid.

10. A polycarbonate according to claim 1, wherein the bis(halogenoalkyl)-ester of a dibasic acid is a bis(halogenoalkyl)-ester of a heterocyclic dicarboxylic acid.

TABLE 9

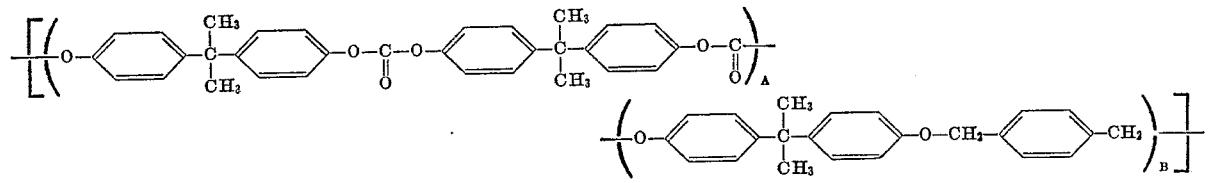

| Polymer No. | Ratio A | Ratio B | Tm, °C. | S.P., °C. | E, kg./sq. mm. | Y, kg./sq. mm. | T, kg./sq. mm. | ε, Percent | [η], dl./g. |
|---|---|---|---|---|---|---|---|---|---|
| 1 | 100 | | 268 | 145 | 233 | 6.6 | 6.6 | 12 | 1.0 |
| 49 | 95 | 5 | 226 | 115 | 244 | 6.4 | 5.9 | 57 | 1.12 |
| 50 | 80 | 20 | 226 | 90 | 259 | 6.3 | 5.8 | 32 | 1.32 |

We claim:

1. A polycarbonate consisting essentially of units of the formula:

(A) 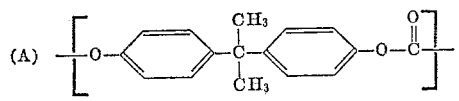

11. A polycarbonate according to claim 1, wherein the bis(halogenoalkyl)-ester of a dibasic acid is a bis(halogenoalkyl)-ester of an aromatic disulfonic acid.

12. A polycarbonate according to claim 1, wherein the bis(halogenoalkyl)-ester of a dibasic acid is a bis(halogenoalkyl)-ester of an aromatic monocarboxysulfonic acid.

13. Shaped articles formed of a polycarbonate with increased crystallizability as defined in claim 1.

14. Films formed of a polycarbonate according to claim 1.

15. Process for increasing the modulus of elasticity and the softening temperature of a shaped article made from a polycarbonate according to claim 1 which comprises the step of crystallizing said shaped articles by thermal treatment at a temperature above the glass transition temperature of said polycarbonate.

References Cited

UNITED STATES PATENTS

| | | | |
|---|---|---|---|
| 2,799,666 | 7/1957 | Caldwell | 260—47 |
| 3,062,780 | 11/1962 | Rinke et al. | 260—47 |
| 3,203,926 | 8/1965 | Deanin et al. | 260—47 |

FOREIGN PATENTS

| | | |
|---|---|---|
| 842,759 | 7/1960 | Great Britain. |

SAMUEL H. BLECH, *Primary Examiner.*